United States Patent [19]
Sasaki et al.

[11] Patent Number: 5,227,988
[45] Date of Patent: Jul. 13, 1993

[54] APPARATUS FOR DETECTING VARIOUS PROCESS VALUES AND APPARATUS FOR RECORDING INFORMATION

[75] Inventors: Yuzuru Sasaki; Takayuki Shibata, both of Tokyo, Japan

[73] Assignee: Nippon Steel Corporation, Tokyo, Japan

[21] Appl. No.: 938,586

[22] Filed: Sep. 2, 1992

Related U.S. Application Data

[63] Continuation of Ser. No. 607,669, Nov. 1, 1990, abandoned.

[30] Foreign Application Priority Data

Nov. 9, 1989 [JP] Japan .................................. 1-291695

[51] Int. Cl.⁵ .............................................. G06F 15/00
[52] U.S. Cl. .............................................. 364/709.01
[58] Field of Search ............... 364/709.01, 709.02, 364/709.1, 709.11, 709.13, 706, 705.06, 556; 73/644; 455/2

[56] References Cited

U.S. PATENT DOCUMENTS

| | | | |
|---|---|---|---|
| 4,091,446 | 5/1978 | Demonte et al. | 364/706 |
| 4,153,937 | 5/1979 | Poland | 364/706 |
| 4,156,917 | 5/1979 | Olander, Jr. et al. | 364/706 |
| 4,385,366 | 5/1983 | Housey, Jr. | 364/709.1 |
| 4,634,845 | 1/1987 | Hale et al. | 364/705.06 |
| 4,827,771 | 5/1989 | Cary et al. | 73/644 |
| 4,916,441 | 4/1990 | Gombrich | 364/709.11 |
| 5,019,974 | 5/1991 | Beckers | 364/709.02 |
| 5,023,929 | 6/1991 | Call | 455/2 |
| 5,079,728 | 1/1992 | Adams et al. | 364/556 |

Primary Examiner—Long T. Nguyen
Attorney, Agent, or Firm—Pollock, Vande Sande & Priddy

[57] ABSTRACT

A versatile detection apparatus for acquisition of various data from objects using a plurality of different detection sensors acquiring information from the object and a preselected first memory storing computation procedures for adapting apparatus to the selected detection sensors comprises first connection members for detachably connecting the selected detection sensors to the detection apparatus, second connection members for detachably connecting the first memory to the detection apparatus, and an inspection device for inspecting coincidence between the selected detection sensors connected to the first connection members and the preselected memory connected to the second connection members.

28 Claims, 3 Drawing Sheets

APPARATUS FOR DETECTING VARIOUS PROCESS VALUES AND APPARATUS FOR RECORDING INFORMATION

This application is a continuation of application Ser. No. 07/607,669, filed Nov. 1, 1990, now abandoned.

BACKGROUND OF THE INVENTION

1. Field of the Invention

This invention relates to an apparatus for collecting and recording signals of various process values in equipments in factories, in environments of offices and hospitals, in human bodies, and the like, and to an apparatus for recording information.

2. Description of the Related Art

There has been known a detection apparatus integrated with an information recording apparatus called "data logger", which receives various analog signals, for example, temperature, pressure and sound, provided by sensors disposed at certain locations in a process plant or electronic machine system, performs A/D conversion of the analog signals, and records the resulting digital data. Data recorded in the data logger is used intact as management information or control information for the system management and quality control, or analyzed with a computer and used for the system or machine control, fault prediction, quality control, and the like.

Such a data logger is conventionally designed for each particular purpose and usage in the research and development section, manufacturing section and quality control section of various industrial fields. For example, various sensors used for a data logger need to have distinct filtering characteristics to produce sensor outputs suitable for the usage, and therefore conventional data loggers have been configured as dedicated apparatus inclusive of certain types of sensors and filters having prescribed filtering characteristics thereby to meet the requirements of individual application fields.

Thus, a conventional data logger is designed for a specific purpose, and it is virtually infeasible to use one data logger in other application fields. Data loggers have been treated as special equipment used by expert technicians, rendering an impression of remote devices to ordinary people, resulting in a limited market area. Their intricate and relatively large scale arrangement have required a proficient, handling knowledge.

Some data loggers which are small in size, light in weight, portable adapted to be set at any subject to be monitored, such as for example, a data logger L820 delivered by Unipulse Corp., in Koshigaya, Japan, which is usable in monitoring temperatures at maximum 6 points using thermocouples, and DL-100M produced by TEAC Corp., in Musashinoshi, Japan, being able to monitor temperatures at maximum 8 points and to store processed data in an IC card. Those prior art of portable loggers can be equipped with only one kind of sensors, though the sensors are exchangeable, because the programs for calculation of digital filtering and so on are fixedly stored inside the loggers and because the monitors have no means for changing programs according to any change of the sensors to be adapted to the purposes and subjects of monitoring.

SUMMARY OF THE INVENTION

This invention is intended to deal with the foregoing situation, and its prime object is to provide a general-purpose detection apparatus and information recording apparatus which, as a single unit, is operative to collect and record various information in various application fields.

The inventive detection apparatus comprises first connection means which detachably connects detection means for acquiring information from an object of detection, computation means which is connected to the first connection means and performs prescribed computations for the information sampled by the detection means, and second connection means which is connected to the computation means and adapted to detachably connect first memory means for storing the procedure of computations carried out by the computation means. The apparatus may further comprise third connection means which is connected to the computation means and adapted to detachably connect second memory means for storing information produced as a result of computation by the computation means.

The inventive detection apparatus may comprise detection means which acquires information from an object of detection, first connection means which connects detachably the detection means, computation means which is connected to the first connection means and performs prescribed computations for information sampled by the detection means, first memory means for storing the procedure of computations carried out by the computation means, and second connection means which is connected to the computation means and adapted to detachably connect the first memory means. The apparatus may further comprise second memory means which stores information produced as a result of computation by the computation means. The apparatus may further comprise third connection means which is connected to the computation means and adapted to detachably connect the second memory means.

The inventive information recording apparatus comprises a sensor connecting section to which one or more sensors of various types are connected selectively, an A/D converter which is connected to the sensor connecting section and converts the analog output signals of the sensors into digital data, a first memory coupling section to which a first memory device is detachably coupled, the first memory device storing filtering characteristics selecting information for selecting filtering characteristics for the output data of the A/D converter, digital processing means which is connected to the first memory coupling section and A/D converter and operates to process the output data from the A/D converter based on the filtering characteristics selected in response to the filtering characteristics selecting information, and a second memory coupling section which is connected to the digital processing means and adapted to detachably connect a second memory device for storing the output data from the digital processing means. The digital processing means may comprise means which performs a digital filtering process for the output data from the A/D converter based on the filtering characteristics selected in response to the filtering characteristics selecting information stored in the first memory device, and performs a prescribed analysis for the processed data.

The inventive detection apparatus operates on its computation means to implement a prescribed computation for information sampled by the detection means which is connected to the first connection means. The computation means performs the computation in accordance with the processing procedure stored in the first memory device which is connected to the second connection means. Accordingly, by connecting a detection means of a proper type to the first connection means and by connecting a first memory means, which stores for the computation means the procedure of computation which matches the type of detection means in connection or computation which yields intended information, to the second connection means, the computation means produces information as a result of proper computation depending on the purpose and usage of the apparatus. In the case of the arrangement including the second memory means, information produced as a result of process by the computation means is stored in it.

The inventive information recording apparatus operates on its A/D converter to convert an analog output signal from a sensor connected to the sensor connecting section into digital data, and operates on its digital processing means to implement a digital filtering process for the digital data. The digital processing means performs the digital filtering process for the data in accordance with the filtering characteristics which is selected in response to the filtering characteristics selecting information stored in the first memory device coupled to the first memory coupling section. The data produced as a result of process by the digital processing means is stored in the second memory device which is coupled to the second memory coupling section.

Accordingly, with a sensor of any type being connected to the sensor connecting section, a proper data filtering process which matches the type of sensor can be implemented through the attachment of the first memory device, which stores the filtering characteristics selecting information for selecting the intended filtering characteristics, to the first memory coupling section. Through the combinational use of various sensors and various first memory devices which store distinct filtering characteristics selecting information, it becomes possible to collect a variety of intended digital data and store them in the second memory device. In the case of a digital processing means having a data analyzing function, it yields data which is rendered a filtering process and a prescribed analysis.

These and other features and advantages of this invention will become more apparent from the following description taken in conjunction with the accompanying drawings.

DESCRIPTION OF THE PREFERRED EMBODIMENT

Figure 1:
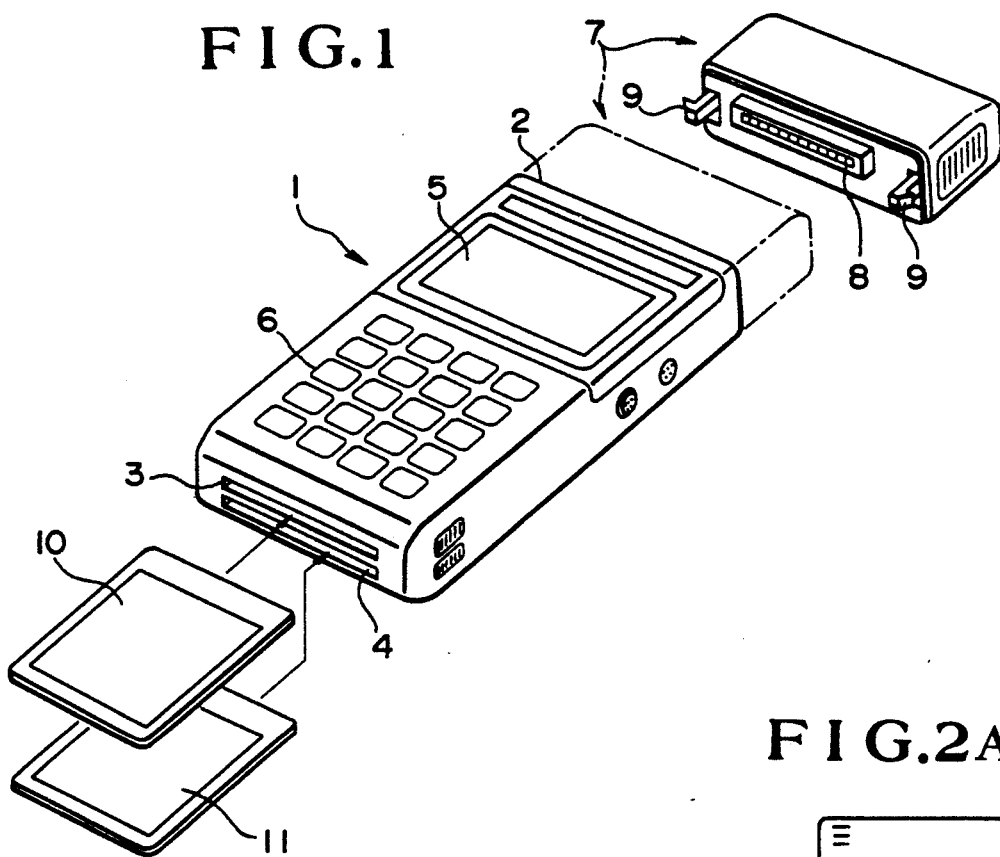
FIG. 1 is an external perspective diagram showing an embodiment this invention.

FIG. 1 shows the external view of a detection apparatus integrated with an information recording apparatus according to the present invention. The apparatus 1 has one end provided with a sensor coupling section 2 and has another end provided with card insertion slots 3 and 4. Provided on the upper surface of the apparatus 1 are display section 5 formed of liquid crystal elements and a key section 6 including a mode setting key and ten-key set used for the entry operation.

The sensor coupling section 2 is designed to attach detachably a sensor unit 7. The sensor unit 7 is provided therein with one or more built-in sensors of various types or provided with a connector for connecting external sensors which receive informations from objects to be detected, and it also has a connector 8 and a pair of detents 9 used for connection with a connector (not shown) of the sensor coupling section 2.

The card insertion slot 3 is used to removably insert a portable program card 10, and the card insertion slot 4 is used to insert a data card 11.

The program card 10 is an IC card which incorporates such a memory device as ROM, in which are stored the filtering characteristics selecting information for selecting a filtering characteristics for the sensor output supplied by the sensor unit 7, analyzing means specifying information for methods of a prescribed data analysis, and various working programs such as computation programs used to produce the intended information. A variety of program cards 10 are available to match the type of sensor unit 7 used and the type of information produced from the sensor output provided by the sensor unit 7.

The data card 11 is an IC card which incorporates such a memory device as a capacious RAM, in which are stored the output data produced as a result of digital processing by the apparatus 1 and also data produced as a result of computation or analysis.

The display section 5 is designed to display the output data and the result of analysis in forms of spectrum graphs or other graphs.

Figure 2A:
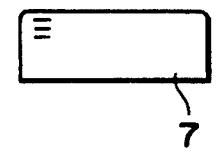
FIGS. 2A, 2B, 2C and 2D are diagrams showing embodiments of the sensor unit.
Figure 2B:
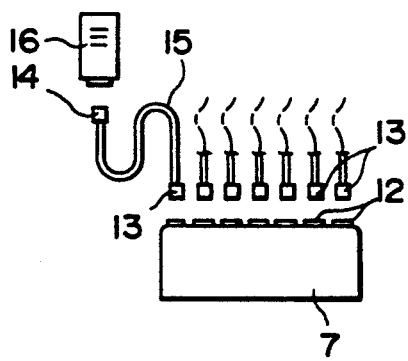
Figure 2C:
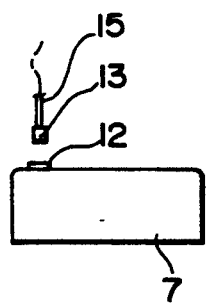
Figure 2D:
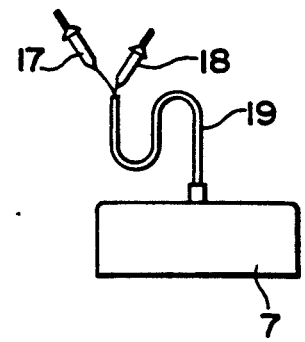

FIGS. 2A to 2D show various types of sensor unit 7. Shown in FIG. 2A is a sensor unit which incorporates one or more sensors of various types, which include, for example, thermal sensors, pressure sensors, humidity sensors, luminance sensors, and vibration sensors. Shown in FIG. 2B is a sensor unit of a multi-channel type, on which are provided a plurality of connectors 12 to be connected with a connector 13 on one end of a cable 15 which has another connector 14 on its other end to be connected with various external sensors 16. Shown in FIG. 2C is a sensor unit of a single channel type, on which is provided a connector 12 as described above. Shown in FIG. 2D is a sensor unit in connection with a cable 19, which has another end provided with a pair of sensors 17 and 18.

Figure 3:
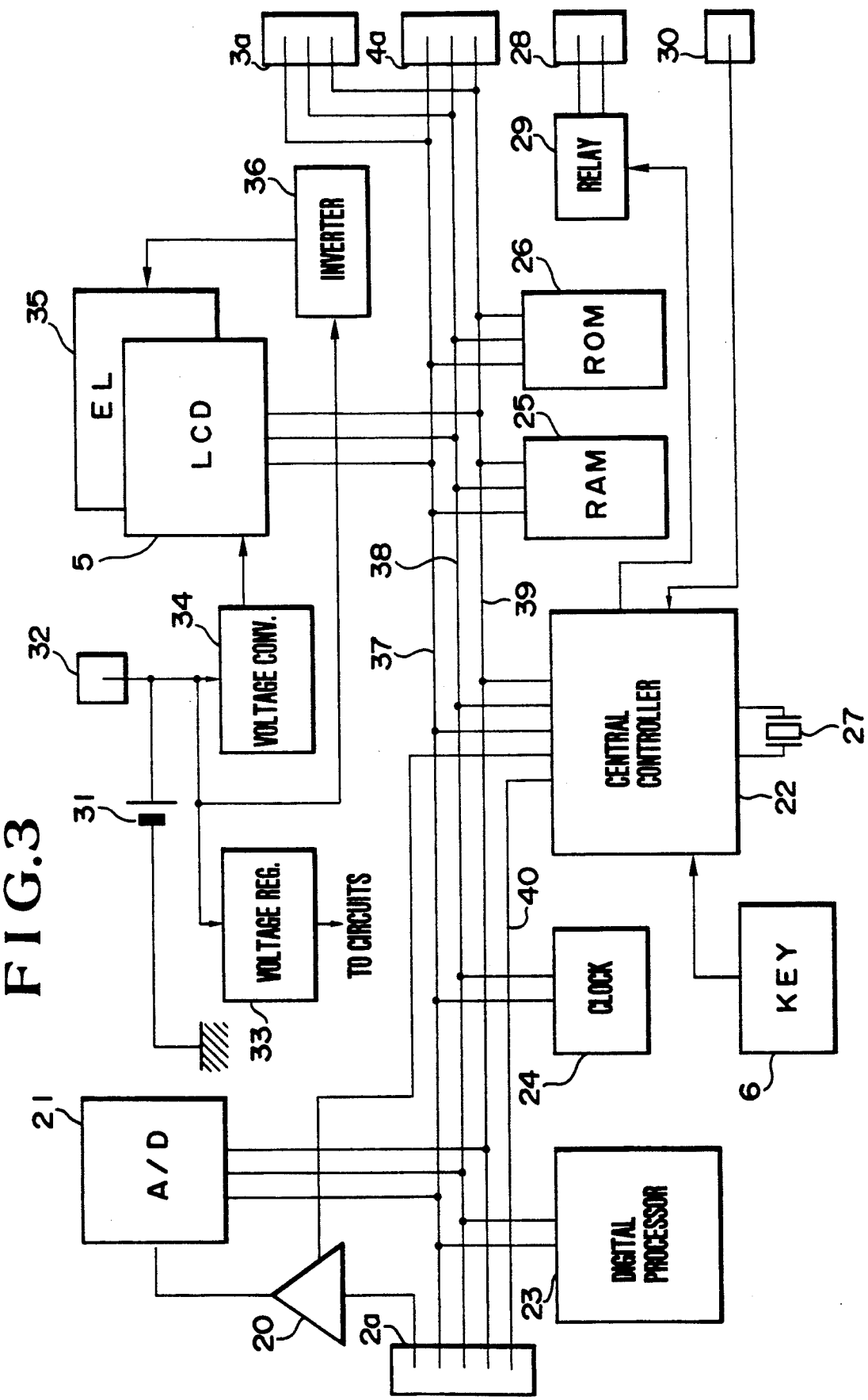
FIG. 3 is a block diagram showing the circuit arrangement based on an embodiment of this invention.

FIG. 3 is a block diagram showing the internal arrangement of the apparatus 1.

In the figure, the apparatus 1 has a sensor terminal 2a provided at the sensor coupling section 2, a program card connecting terminal 3a provided inside the card insertion slot 3, and a data card connecting terminal 4a provided inside the card insertion slot 4. It is also possible to adopt non-contact card connection based on inductive coils, in place of the connecting terminals 3a and 4a. The apparatus 1 further includes a filter circuit 20 which determines the pass band and threshold of the analog signals entered through the sensor terminal 2a and an A/D converter 21 which converts the output of the filter circuit 20 into digital data so as to process informations from sensors.

The A/D converter 21 has its sampling period controlled in the range from 12 $\mu$s to 999 min, for example. Indicated by 22 is a central controller based on a microcomputer, which controls the overall apparatus. The central controller 22 has a trigger function which determines the timing of data collection and commencement and termination of recording, an alarm function, a recognizing function to read out identification codes of sensors attached to the apparatus, and a time-division data processing function based on the sensor unit 7 of the multi-channel type shown in FIG. 2B. The trigger function issues trigger signals which determine data collection and commencement and termination of recording in response to the time of clock, time duration, sensor output level, and external trigger signal.

The apparatus 1 incorporates a digital processor 23, which performs digital filtering process and prescribed data analysis (computation) for the output data of the A/D converter 21 in response to the instruction from the central controller 22. The digital processor 23 is formed of a digital signal processor (DSP), for example, DSP-5600 manufactured by Motorola Inc. The digital processor 23 performs arithmetic operations, calculations of mean value, maximum value, minimum value, total value, standard deviation, differentiation, integration, fast Fourier transformation, etc. and operations of spectrum analysis, etc.

Indicated by 24 is a clock circuit which generates time signals, 25 is a data latch memory formed of a random access memory (RAM) for temporarily storing data processed by the central controller 22 and digital processor 23, 26 is a working program memory formed of a read-only memory (ROM) for storing the working programs of the central controller 22 and digital processor 23, 27 is a buzzer which is operated by the central controller 22, 28 is an external terminal for connecting an external device such as an alarm device, 29 is a relay which is operated by the central controller 22 to transmit an alarm signal or the like to the external terminal 28, and 30 is an external trigger terminal for receiving a trigger signal from an external timer, switch or the like.

Indicated by 31 is a power source battery, 32 is an external power supply terminal, 33 is a voltage regulator which stabilizes the supplied voltage to be supplied to the circuits, 34 is a voltage converter which converts the supplied voltage to a prescribed voltage level to be supplied to the display section 5, 35 is an electroluminescence light source for the backlight illumination of the display section 5, and 36 is an inverter which produces an a.c. voltage from the supplied voltage to drive the electroluminescence light source 35. The key section 6 is connected to the central controller 22. Indicated by 37 is a data bus, 38 is a control bus, 39 is an address bus, and 40 is a sensor identification code bus.

Next, the operation of the foregoing arrangement will be explained.

Initially, a sensor unit 7 selected depending on the detection purpose is coupled to the sensor coupling section 2 and connected to its sensor terminal 2a. A sensor in connection transmits a signal indicative of its type to the central controller 22 over the sensor identification code bus 40. It is also possible to identify the type of sensor unit based on the on/off signal which appears on the sensor unit terminal. For example, using four pins of terminal allows the identification of 16 types of sensor units.

A program card 10, which is selected depending on the type of sensor unit 7 attached to the sensor coupling section 2 or the type of information to be produced from the sensor output provided by the sensor unit 7, is inserted to the card insertion slot 3. At this time, if the program card 10 and sensor unit 7 do not match, an alarm message is displayed on the display section so as to prompt the operator to replace the card. A data card 11 is inserted into the card insertion slot 4. The program card 10 is connected to the program card connecting terminal 3a and the data card 11 is connected to the data card connecting terminal 4a.

The apparatus 1, with a sensor unit 7, program card 10 and data card 11 being attached thereto, is placed at a prescribed location in a system, equipment or room where the information is to be collected.

The central controller 22 issues trigger signals for collecting data and commencing the recording at the preset time or on arrival of the sensor output at the preset level, or in response to the entry of the trigger signal through the external trigger terminal 30. The analog sensor output signals received on the sensor terminal 2a are fed through the filter circuit 20, which has the pass band and level controlled by the central controller 22, and delivered to the A/D converter 21 and converted into digital data in a prescribed sampling period. The resulting digital data is subjected to a digital filtering process by the digital processor 23 in accordance with the filtering characteristics which is selected in response to the filtering characteristics selecting information, the type of sensor, and the object of measurement, for example, based on such a filtering scheme as finite impulse response (FIR) filter or infinite impulse response (IIR) filter, stored in the program card 10. The processed data is displayed on the display section 5 at a prescribed interval together with the time imparted by the clock circuit 24, and it is also stored in the data card 11 by way of the data bus 37 and data card connecting terminal 4a.

The data resulting from the digital filtering process is subjected to a prescribed data analysis (computation for the data) specified by the analyzing item specification stored in the program card 10, and the result of analysis is displayed on the display section 5 and also stored in the data card 11. For example, frequency analysis for the motor vibration is conducted to evaluate the magnitude of specific frequency components, and the result is used to prompt the replacement of the retainer or the overhaul of the motor.

The filtering process and data analysis (computation) process conducted by the digital processor 23 are carried out in accordance with the programs stored in the internal ROM 26 or the program card 10.

The central controller 22 monitors the data processed by the digital processor 23 and, if the sensor output has exceeded a prescribed threshold for example, it issues the alarm signal to activate the buzzer 27 or operates the relay 29 thereby to activate the alarm device connected to the external terminal 28. In case a plurality of sensors are used, the resulting multi-channel data are recorded on a time division basis.

These operations of data collection, analysis and recording are terminated on arrival of the preset time, on expiration of the prescribed time length, on arrival of the sensor output at the preset value, or in response to the external trigger signal.

Next, some applications which are made possible through the combination of a sensor unit 7 and a program card 10 will be explained.

1. For motors, control valves, etc. in a factory, the vibration, noise, number of revolutions, etc. are measured and recorded for their maintenance activity. Threshold values may be set in the apparatus 1 so that alarm signals are produced when the sensor outputs have exceeded the respective thresholds.

2. In a computer room, environmental data are collected for recording at some locations inside the equipment and terminal devices and in the passage, so that more positive environmental management is carried out.

3. In an office room, the temperature, humidity, luminance level, etc. are measured and recorded so as to improve the working environment.

4. The compact and light-weight apparatus 1 can be attached to the body of a sporting person or patient thereby to measure the number of heart beats, electrocardiogram, body temperature, etc.

5. Temperature and humidity control of a refrigerator.

6. Measurement of outdoor environment (noise, odor, wind velocity, luminance level, etc.)

7. Automobile running test on fuel economy, output torque, etc.

8. Environmental logging (temperature, humidity, vibration, etc.) during the shipment of a home delivery items.

The information collecting, analyzing and recording system consisting of the apparatus 1, sensor unit 7, program card 10 and data card 11 can further be expanded. For example, a relay of sensor is coupled to the sensor coupling section 2 of the apparatus 1, and the sensor unit 7 is coupled to the sensor relay. The sensor output provided by the sensor unit 7 is A/D converted in the sensor relay, and the data is sent directly to a host computer, so that more elaborate performance of data collection and analysis is achieved. The sensor relay can be a communication-oriented interface such as the GPIB interface or RS232C interface. A radio wave or ultrasonic transmitter may be provided for the apparatus 1, so that processed data is sent on a wireless basis to the host computer. It is also possible for the user to utilize the computation function of the digital processor 23 to develop a program to be stored in the program card 10.

Figure 4:
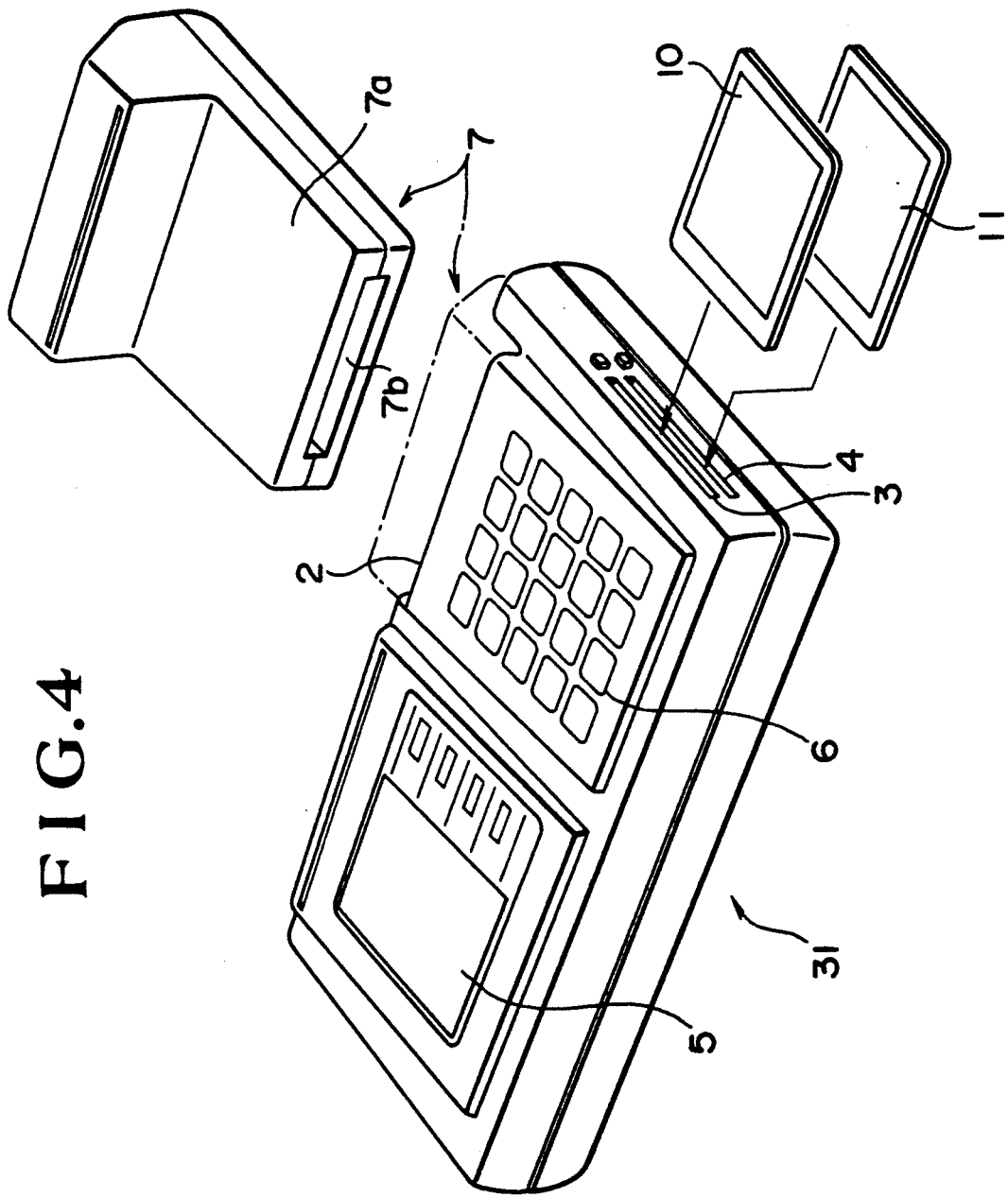
FIG. 4 is an external perspective diagram showing another embodiment of this invention.

The apparatus 1 can have the external structure as shown by 31 in FIG. 4. In this arrangement, the sensor unit 7 has a coupler 7a, with a connection slot 7b being formed in one end thereof, and the sensor unit 7 is coupled to the apparatus by inserting the coupler 7a into a slot (not shown) formed at the sensor coupling section 2. This arrangement facilitates the attachment and detachment of the sensor unit 7. In the figure, the apparatus 31 is substantially identical to the apparatus 1 in FIG. 1, except for the external arrangement. Portions corresponding to those of FIG. 1 are given the common symbols, and their explanation is not repeated.

The first memory means and second memory means may be integrated as a single IC card, with the respective first memory coupling section (second connection means) and second memory coupling section (third connection means) being also integrated into a single memory coupling section (connection means). Connection with the main component blocks is made through the buses 37, 38 and 39, and the integrated coupling section has the same structure as any one of the separate coupling sections.

The information recording apparatus 1 based on the foregoing embodiment of this invention can deal with multiple purposes in extensive application fields by merely replacing the sensor unit 7 and program card 10. Despite its versatile functions, the apparatus is compact and light-weight, it is transportable and does not need a large installation space, whereby the application field can further be expanded. Consequently, it gains the market area, enabling scale production, advantage is further enhancing the economical advantage.

In addition, through the improvement of the program card 10, the life time of apparatus can be extended in order to meet more extensive demands. The apparatus is readily manufactured on an OEM-basis. Through the use of the program card 10, it is made possible to realize an omnipotent detecting apparatus and information recording apparatus which can be handled and operated easily by unskilled users.

With the inventive detection apparatus, in which the first memory means provides computational procedure for the computation means, it becomes possible to implement computations for information sampled by detection means in connection, computations dependent on the type of detection means, and computations for producing intended information. Accordingly, through the combinational use of various detection means and several first memory means in which distinct computational procedures are stored, the apparatus can cope with the collection of various information in various fields due to its enhanced versatility.

In the case of the arrangement, in which information processed by the computation means is stored in the second memory means, the stored information can be retrieved and used arbitrarily for various purposes.

With the inventive information recording apparatus, which implements data filtering processes based on various filtering characteristics, it becomes possible to perform a proper digital filtering process for data depending on the type of various sensors connected selectively to the sensor connecting section. By choosing a sensor type and filtering characteristics, various intended information can be collected and recorded due to the enhanced versatility of the apparatus.

In case the digital processing means is arranged to implement a prescribed analysis for data as well as the digital filtering process for the data, the result of data analysis can be yielded easily and promptly.

We claim:

1. A versatile detection apparatus for acquisition of various data from objects, said detection apparatus using a plurality of different detection means each different detection means being capable for acquiring different information from an object and a preselected first memory means for storing computation procedures for adapting said apparatus to a selected detection means, said detection apparatus comprising:

first connection means for detachably connecting said selected detection means to said detection apparatus;

second connection means for detachably connecting to said detection apparatus said preselected first memory means compatible with said selected detection means; and computation means, operatively connected with said first connection means and said second connection means, for implementing a prescribed computation on information provided by said selected detection means through said first connection means by use of said computation procedures supplied from the selected first memory means through said second connection means;

whereby said detection apparatus permits gathering different data in different application fields by selecting applicable detecting means and compatible first memory means for a selected data.

2. A detection apparatus according to claim 1, further comprising, third connection means for detachably connecting second memory means to said computation means; said second memory means storing information processed by said computation means.

3. A detection apparatus according to claim 1, wherein said second connection means detachably connects said first memory means for further storing information processed by said computation means.

4. A versatile detection apparatus for acquisition of various data from objects, said detection apparatus using a plurality of different detection means adapted for acquiring different information from an object and a preselected first memory means storing computation procedures for adapting said apparatus to a selected detection means, said detection apparatus comprising:
   a body member having a first connecting section, a second connecting section and a computation section therebetween;
   said first connecting section including first connection means for detachably connecting the selected detection means to said detection apparatus and means for transmitting identification signals to said computation section for identified the connected selected detection means;
   said second connecting section including second connection means for detachably connecting said preselected first memory means to said detection apparatus compatible with said identified connected detection means; and
   said computation section including computation means, operatively connected with said first connection means and said second connection means, for receiving said identification signals and for implementing a prescribed computation on information provided by said selected detection means through first connection means by said computation procedures provided from the first memory means through said second connection means.

5. A detection apparatus according to claim 4, further comprising, third connection means for detachably connecting second memory means to said computation means; said second memory means storing information processed by aid computation means.

6. A detection apparatus according to claim 4, said first connection means including a connector fastening said detection means to said first connection means and a lock mechanism for preventing said connector from disconnection.

7. A versatile detection apparatus for acquisition of various data from objects, said detection apparatus using a plurality of different detection means adapted for acquiring information from an object and with a preselected first memory means storing computation procedures for adapting said apparatus to a selected detection means, said detection apparatus comprising:
   first connection means for detachably connecting the selected detection means to said detection apparatus;
   second connection means for detachably connecting said first memory means to said detection apparatus;
   means for transmitting signals to an inspection means for identifying the connected selected detection means; and
   said inspection means inspecting coincidence between said selected detection means connected to said first connection means and said preselected memory means connected to said second connection means.

8. A detection apparatus according to claim 7 further comprising:
   an alert means for alarming discrepancy between said detection means connected to said first connection means and said memory means connected to said second connection means.

9. A detection apparatus according to claim 8, wherein said alert means comprises a display.

10. A detection apparatus according to claim 8, wherein said alert means further comprises a sound device.

11. A detection apparatus according to claim 7, wherein said second connection means includes a memory medium of memory card.

12. A detection apparatus according to claim 11, wherein said memory medium includes a read-only-memory element of solid state.

13. A detection apparatus according to claim 7 further comprising a processing means for processing said information derived from the detection means connected to said first connection means and for providing processed information.

14. A detection apparatus according to claim 13, wherein said memory means includes a random access memory for recording the processed information by said processing means.

15. A detection apparatus according to claim 13, further comprising an input means for manual inputting of information from outside to said processing means.

16. A detection apparatus according to claim 15, further comprising a display means for displaying said information from said input means.

17. A detection apparatus according to claim 13, further comprising a housing including therein said processing means, said second connection means, an input means for manually inputting an information from outside to said processing means and a display means for displaying said information taken from said input means, faces of said input means and said display means appearing on one surface of said housing.

18. A detection apparatus according to claim 17, wherein said second connection means being located inside of said housing on a surface opposite to said input means.

19. A detection apparatus according to claim 18, wherein said housing further includes an inserting aperture for receiving a random access memory for recording the processed information by said processing means and connecting said random access memory to said second connection means provided inside said housing.

20. A detection apparatus for acquisition of various data from objects including a preselected detection means for acquiring selected information from an object, a processing means for processing information obtained through said detection means, and a memory means for storing computation procedures to be effected by said processing means, said detection apparatus further comprising:
   a first connection means for detachably connecting said preselected detection means and said processing means, for transferring signals identifying said connected detection means and for transferring said information acquired from said detection means to said processing means;
   a second connection means for detachably connecting said memory means and said processing means for transferring calculation procedures stored in said memory means connected with said second connection means; and an inspection means for inspecting coincidence between said connected preselected detection means for a selected data connected with said first connection means and said memory means connected with said second connection means.

21. A detection apparatus comprising:

detection means for acquiring information from an object of detection;

first connection means for detachably connecting said detection means to a body of said detection apparatus and for transferring information identifying said detection means;

computation means for implementing a prescribed computation for information provided by said detection means connected to said first connection means, said computation means being located in said body of said detection apparatus;

first memory means for storing said prescribed computation to be carried out by said computation means.

22. A detection apparatus according to claim 21, further comprising, second memory means for storing information processed by said computation means.

23. A detection apparatus according to claim 22, further comprising, third connection means for detachably connecting said second memory means to said detection apparatus.

24. A detection apparatus according to claim 22 wherein said second memory means has a structure integrated with said first memory means.

25. A detection apparatus having a receiving means for receiving an information from an object to be detected, and a processing means for processing said information provided by said receiving means, said detection apparatus further comprising:

first connecting means for detachably connecting said receiving means with said processing means and transferring thereto information identifying said detection means; and second connecting means for detachably connecting a first storing means with said processing means, said first storing means storing computations of a process to be carried out by said processing means.

26. A detection apparatus according to claim 25, further comprising, third connecting means for detachably connecting a second storing means to said processing means, said second storing means storing an information processed by said processing means.

27. A detection apparatus according to claim 26, wherein said storing means comprises a portable card type memory device having a random access memory device.

28. A detection apparatus according to claim 25, wherein said first storing means comprises a portable card type memory device having a read only memory device.

* * * * *